United States Patent [19]

House

[11] 4,435,309

[45] Mar. 6, 1984

[54] METHOD OF LIQUIFYING WAXY MATERIALS

[75] Inventor: Roy F. House, Houston, Tex.

[73] Assignee: Venture Innovations, Inc., Lafayette, La.

[21] Appl. No.: 303,703

[22] Filed: Sep. 18, 1981

[51] Int. Cl.³ .............................................. B01J 13/00
[52] U.S. Cl. .................................... 252/314; 252/311; 252/311.5; 252/315.1
[58] Field of Search ......................... 252/311, 314, 528

[56] References Cited

U.S. PATENT DOCUMENTS 2,311,338  2/1943  Holtzclaw et al. .............. 252/311 X
3,959,155  5/1976  Montgomery et al. ......... 252/528 X
4,340,500  7/1982  Boylan ............................ 252/314 X

*Primary Examiner*—Richard D. Lovering
*Attorney, Agent, or Firm*—Roy F. House

[57] ABSTRACT

The invention discloses a method of liquifying materials which are either waxy solids at ambient temperatures or solid or semi-solid mixtures of such waxy materials and a solvent therefor. Specifically, the invention discloses a method of preparing a liquid suspension of a waxy material in a solvent wherein a solution of the waxy material in the solvent is formed at elevated temperatures, the solution is cooled to produce a semi-solid to solid phase, and thereafter the mixture is sheared.

9 Claims, No Drawings

METHOD OF LIQUIFYING WAXY MATERIALS

The invention discloses a method of liquifying a semi-solid to solid mixture of a waxy material and a liquid which is a solvent for the waxy material at elevated temperatures.

Many materials are known which are waxy solids at ambient temperatures. Over the years various means have been utilized to provide these waxy materials in an easily handleable liquid form. Generally, solutions of the waxy material in a suitable solvent have been prepared. Depending on the concentration of the waxy material in the solution, there have been produced solutions which range from very fluid mixtures to viscous mixtures and even solid to semi-solid mixtures. Such solid or semi-solid mixtures must be heated to reduce the viscosity (i.e., to re-solubilize at least a portion of the waxy material in the solvent) before obtaining an easily handleable liquid. Representative commercially obtainable waxy fatty nitrogen compounds which have been solubilized in this manner are given in Table 1.

As indicated in Table 1, the activity of these waxy materials ranges from 25% to about 90% by weight. It is desirable to obtain liquids (at ambient temperatures) which contain larger concentrations of the waxy material, thus reducing the amount of solvent necessary to produce the liquids.

Accordingly, it is an object of this invention to provide a method of liquifying an organic material which is a waxy solid at ambient temperature.

It is another object of this invention to provide a method of liquifying a mixture of a waxy solid and a solvent which is solid or semi-solid at ambient temperature.

It is a further object of this invention to provide liquid suspensions at ambient temperatures of organic materials, which are waxy solids at ambient temperatures, in solvents in which the organic materials are completely soluble at elevated temperatures.

TABLE 1

Commercially Available Mixtures of Waxy Solids in Solvents Therefor

| Product Name | Type of Waxy Material* | % Waxy Material | Solvent | Form at Room Temperature |
|---|---|---|---|---|
| ARQUAD 12-33 | QAC | 33 | IPA/$H_2O$ (23/43) | Liquid |
| ARQUAD 12-50 | QAC | 50 | IPA/$H_2O$ (34/15) | Liquid |
| ARQUAD 16-50 | QAC | 50 | IPA/$H_2O$ (35/14) | Liquid |
| ARQUAD 18-50 | QAC | 50 | IPA/$H_2O$ (36/13) | Liquid |
| ARQUAD C-50 | QAC | 50 | IPA/$H_2O$ (36/13) | Liquid |
| ARQUAD S-50 | QAC | 50 | IPA/$H_2O$ (36/13) | Liquid |
| ARQUAD T-50 | QAC | 50 | IPA/$H_2O$ (36/13) | Liquid |
| ARQUAD 2C-75 | QAC | 75 | IPA/$H_2O$ (17/7.5) | Semi-Liquid |
| ARQUAD 2HT-75 | QAC | 75 | IPA/$H_2O$ (18/6.5) | Paste |
| ARQUAD 25-75 | QAC | 75 | IPA/$H_2O$ (18/6.5) | Semi-Liquid |
| ARQUAD C-33 | QAC | 33 | $H_2O$ | Liquid |
| ARQUAD 16-25W | QAC | 25 | $H_2O$ | Liquid |
| ARQUAD B-100 | QAC | 50 | IPA/$H_2O$ | Liquid |
| DUOQUAD T-50 | DQAC | 50 | IPA/$H_2O$ | Liquid |
| ETHOQUAD C/12 | QAC | 25 | IPA | Liquid |
| ETHOQUAD 18/12 | QAC | 25 | IPA | Liquid |
| ETHOQUAD O/12 | QAC | 25 | IPA | Liquid |
| ETHOQUAD R/13-50 | QAC | 50 | Proprietary Blend | Liquid |
| ETHODUOQUAD R/15-50 | DQAC | 50 | Proprietary Blend | Liquid |
| ARMEEN Z | AC | ca. 50 | Not Known | Slurry |
| AROMOX C/12 | AO | 50 | IPA/$H_2O$ | Liquid |
| AROMOX DMC | AO | 40 | IPA/$H_2O$ | Liquid |
| AROMOX DMHT | AO | 40 | IPA/$H_2O$ | Liquid |
| ADOGEN 444 | QAC | 50 | Not Known | Liquid |
| ADOGEN 442 | QAC | 75 | Not Known | Liquid |
| VARIQUAT E228 | QAC | 25 | Not Known | Liquid |
| VARIQUAT K375 | QAC | 75 | Hexylene Glycol | Liquid |
| VARISOFT 137 | QAC | 90 | Not Known | Paste |
| VARIQUAT 638 | QAC | 75 | Not Known | Liquid |
| VARIQUAT C-75 | QAIC | 75 | Not Known | Semi-Liquid |
| VARISOFT 475 | QAIC | 78 | Not Known | Liquid |
| VARISOFT 6112 | DQAIC | 75 | Not Known | Liquid |
| ADOGEN 477 | DQAC | 50 | Not Known | Liquid |
| KEMAMINE Q-2802C | QAC | 75 | Not Known | Paste |
| KEMAMINE BQ-2802C | QAC | 75 | Not Known | Paste |

*QAC = Quaternary ammonium compound
DQAC = Diquaternary ammonium compound
AC = Amphoteric compound
AO = Amine oxide
QAIC = Quaternary ammonium imidazolium compound
DQAIC = Diquaternary ammonium imidazolium compound I have found that organic materials which are waxy solids at ambient temperatures can be liquified by forming a solution of the organic material in a solvent at an elevated temperature, cooling the solution to a temperature such that a solid or semi-solid, viscous material is formed, preferably to ambient temperature, and thereafter shearing the solid or semi-solid material, to produce a liquid.

The solvent must be chosen such that the waxy organic material is soluble at elevated temperatures, but which is a sufficiently poor solvent for the waxy organic material at ambient temperatures that the waxy organic material solidifies and forms a solid or semi-solid phase with the solvent.

The concentration of solvent must be sufficient to: (1) produce a liquid as a result of the shearing step; and (2)

produce a solid or semi-solid as a result of the cooling step. Thus the concentration of solvent will vary depending on the characteristics of the waxy organic material and the solvent. If a liquid is formed as a result of the cooling step, then too much solvent is present, and if a liquid is not formed as a result of the shearing step, then not enough solvent is present.

A wide variety of waxy organic materials can be used in the process of this invention. Thus all of the organic materials disclosed in Table 1 can be used and liquids can be obtained which contain less solvent when prepared by the process of this invention. Typical waxy materials are fatty quaternary compounds, fatty amines, fatty amine salts, fatty amides, fatty nitriles, fatty acids, fatty alcohols, fatty acid esters, fatty ketones, oxyalkylated compounds, waxes, and like organic materials. Representative, non-limiting, commercially available waxy materials are as follows: Amines-ARMEEN 16D, ARMEEN 18, ARMEEN HT, ARMEEN T, ARMEEN 2C, ARMEEN 2HT, DUOMEEN T, KATAPOL OA-860; Amine Salts-ARMAC C, ARMAC 18D, DUOMAC T; Amides-ARMID C, ARMID HT, ETHOMID HT/15, ETHOMIDE HT/60; Acids-NEO-FAT 16, NEO-FAT 18; Nitriles-ARNEEL 18D; Esters-KESSCO 653, ETHOFAT 60/25, glycerol monolaurate, glycerol monostearate, ethylene glycol distearate, diethylene glycol monostearate; Ketones-methyl heptadecyl ketone; Oxyalkylated Compounds-EMULPHOR OW-870, EMULPHOR EL 620; IGEPAL CA-890, IGEPAL CO-890, IGEPAL CO-970, IGEPAL DM-880, IGEPAL DM-970. These fatty amines are as follows: hexadecyl; octadecyl; hydrogenated tallow; tallow; dicoco; dihydrogenated tallow; N-tallow, 1,3 propane diamine; polyoxyethylated (30) oleyl amine, respectively. These fatty amine salts are the acetate salts of: cocoamine, octadecyl amine, and N-tallow, 1,3, propane diamine, respectively. These fatty amides are: coco, hydrogenated tallow, hydrogenated tallow reacted with 5 moles/mole of ethylene oxide, and hydrogenated tallow reacted with 50 moles/mole of ethylene oxide, respectively. These fatty acids are hexadecanoic and octadecanoic, respectively. The fatty nitrile is stearyl nitrile. The trademarked fatty esters are cetyl palmitate and polyoxyethylene (15) glycol stearate, respectively. These oxyalkylated compounds are: polyoxyethylated (20) oleyl alcohol; polyoxyethylated (30) castor oil; polyoxyethylated (40) octylphenol; polyoxyethylated (40) nonyl phenol; polyoxyethylated (50) nonyl phenol; polyoxyethylated (49) dialkyl phenol; polyoxyethylated (150) dialkyl phenol, respectively.

The preferred solvents for the fatty quaternary ammonium salts, fatty amines, fatty amine salts, fatty amides, fatty nitriles, fatty acids, fatty alcohols, fatty acid esters, and fatty ketones are the lower molecular weight alcohols containing from one to five carbon atoms, and mixtures of these alcohols with water. Representative alcohols are methanol, ethanol, propanol, isopropanol, butanol, pentanol and other isomers thereof. Preferred alcohols are methanol, ethanol, propanol and isopropanol, most especially isopropanol. Other solvents which can be used consist of both polar and non-polar organic liquids, including aromatic and paraffinic hydrocarbons.

I have found that the liquids obtained from the process of this invention may exhibit syneresis, the severity of which increases as the viscosity of the liquid decreases. Generally the viscosity of the liquid decreases as the concentration of solvent in the liquid increases. Ideally the liquid will contain the greatest possible concentration of waxy organic material and still remain a liquid. I have found, however, that the viscosity of the liquids obtained by the process of this invention can be increased, and hence the degree of syneresis decreased, by several means. Thus the liquid can be heated slightly to affect a partial re-solubilization of the waxy organic material. On cooling the re-solubilized waxy organic material solidifies and increases the viscosity of the liquid. Another means of increasing the viscosity of the liquid is to add to the liquid the solid or semi-solid mixture of waxy organic material and solvent obtained after the cooling step. Still another means of increasing the viscosity of the liquid is to add to the liquid a mixture of the waxy organic material and solvent produced by the process of this invention which has been heated slightly to affect a partial re-solubilization of the waxy organic material. Yet another means of increasing the viscosity of the liquid is to add to the liquid a hot solution of the waxy organic material in the solvent. In this manner a portion of the waxy organic material in the liquid is re-solubilized and/or the waxy organic material in the solution solidifies upon cooling thus increasing the viscosity of the liquid.

Other means of increasing the viscosity of the liquid and decreasing the extent of syneresis could be undertaken, such as adding thickeners, suspending agents, etc., but these introduce other components into the liquid and are not recommended.

The term "fatty" as used herein to describe the preferred waxy organic materials utilized in this invention is intended to mean that the molecular structure of such materials contain one or more aliphatic radicals which contains at least twelve carbon atoms. The aliphatic radicals may be saturated or unsaturated and may be substituted such as with hydroxyl groups (i.e., hydrogenated castor oil derivatives). The preferred aliphatic groups are alkyl radicals, however, since materials containing such radicals are less prone to be liquid at ambient temperatures.

The initial solution formed by admixing the waxy organic material and solvent together at an elevated temperature need not be a complete solution of the waxy organic material in the solvent. Thus the temperature can be such that a turbid solution is obtained containing suspended particles of the waxy organic material in a solution of the solvent and waxy organic material. Additionally, all of the solvent necessary to produce the liquids as disclosed herein need not be added initially while forming the solution. Thus a portion of the total solvent needed to form the liquid can be utilized to form the solution, and the remainder of the solvent can be added during the shearing step to produce the desired liquid suspension of the waxy organic particles in the solvent.

I have also found that mixtures of waxy organic materials and a solvent of the type disclosed herein which are solid or semi-solid viscous mixtures at ambient temperatures, such as the mixtures in Table 1 which are not liquids, can be liquified by shearing the solid or semi-solid viscous mixtures. The shearing breaks up the associated waxy organic material into particles suspended in the solvent.

The term "liquid" as used herein is intended to mean a state of matter which takes the shape of the container in which it is placed. Preferably the liquid is sufficiently flowable to be pumpable. Most preferably, the liquid is sufficiently flowable to be pourable.

Suitable mixers for shearing the solid or semi-solid mixture of waxy organic material and solvent are commercially available. The mixer should be capable of producing suspendable particles of the waxy organic material in the solvent without increasing the temperature sufficiently to affect any substantial re-solubilization of the waxy organic material. A slight re-solubilization may be desirable, as indicated hereinbefore, if the concentration of solvent is sufficient to produce a liquid which exhibits syneresis. Commercially available mixers which may be utilized are exemplified by the following: Henschel Fluidizing Mixers (Purnell, Inc., P. O. Box 7488, Houston, Tex. 77008); Myers 550 Series and 850 Series Mixers (Myers Engineering, Inc., 8376 Salt Lake Ave., Bell, Ca. 90201); Ross Double Planetary Mixers (Charles Ross & Son Co., 710 Willets Path, Hauppouge, N.Y. 11787).

The following examples illustrate the preferred embodiments of the invention and are not intended to be limiting.

EXAMPLE 1

A sample of dimethyl dihydrogenated tallow ammonium chloride (DMDHTAC) containing 17.5% by weight of a mixture of isopropanol and water having an isopropanol to water ratio of about 2.77/1 was solid at 72° F. The isopropanol and water were added to the quaternary ammonium salt at an elevated temperature while the salt was a liquid forming a solution.

The solid was sheared in a Waring Blendor forming a viscous pourable liquid. This viscous liquid gelled to a semi-solid state on aging at 72° F. However, it could be returned to the liquid state by simple mixing such as by spatulation.

EXAMPLE 2

A sample of DMDHTAC containing 20% by weight of 3.36/1 weight ratio mixture of isopropanol and water was prepared by adding isopropanol to the solid DMDHTAC sample of Example 1 and shearing the mixture in a Waring Blendor. A liquid was obtained which remained liquid on aging at 72° F.

EXAMPLE 3

A sample of DMDHTAC containing 22.5% by weight of a 4.0/1 weight ratio mixture of isopropanol and water was prepared by heating the DMDHTAC of EXAMPLE 1 to form a clear solution followed by the addition of isopropanol. The solution was cooled forming a semi-solid paste. A portion of this paste was sheared in a Waring Blendor forming a very fluid liquid which remained a pourable liquid at 72° F.

EXAMPLE 4

Upon aging the samples of Examples 1–3 at room temperature (72° F.), it was observed that syneresis occurred in the liquid samples of Example 2 and 3. The degree of syneresis increased as the concentration of solvent increased, i.e., as the viscosity of the liquid decreased.

A portion of the liquid sample of Example 3 was heated slightly to affect a partial re-solubilization of the DMDHTAC particles. Upon cooling to room temperature a more viscous liquid was obtained which was still pumpable and which exhibited much less syneresis on aging.

EXAMPLE 5

A portion of the liquid sample of Example 3 was mixed with a portion of the solid sample of Example 3 which had not been sheared. A more viscous liquid was obtained which was pumpable and which exhibited much less syneresis on aging.

EXAMPLE 6

A portion of the liquid sample of Example 3 was mixed with a portion of the solid sample of Example 3 which had been heated to form a solution. A viscous liquid was obtained which was pumpable and which exhibited much less syneresis on aging.

EXAMPLE 7

A sample of dimethyl benzyl hydrogenatedtallow ammonium chloride (DMBHTAC) containing 17.8% by weight of 2.7/1 weight ratio mixture of isopropanol and water was solid at 72° F. The solid was sheared in a Waring Blendor forming a viscous pourable liquid which gelled to a semi-solid state on aging at 72° F. However, it could be returned to the liquid state by simple mixing such as by spatulation.

EXAMPLE 8

A sample of DMBHTAC containing 19.7% by weight of a 3.19/1 weight ratio mixture of isopropanol and water was prepared by adding isopropanol to the solid DMBHTAC sample of Example 7 which had not been sheared and shearing the mixture in a Waring Blendor. A viscous liquid was obtained which remained pumpable at 72° F. The liquid exhibited no syneresis on aging.

EXAMPLE 9

A sample of methyl benzyl dihydrogenatedtallow ammonium chloride (MBDHTAC) containing 24% by weight of a 2.27/1 weight ratio mixture of isopropanol and water was solid at 72° F. The solid was sheared in a Waring Blendor forming a viscous pourable liquid, which gelled to a semi-solid consistency on aging at 72° F. The sheared sample could be returned to a viscous, pourable liquid by simple mixing such as by spatulation.

EXAMPLE 10

A sample of MBDHTAC containing 26.7% by weight of a 2.77/1 weight ratio mixture of isopropanol and water was prepared by adding isopropanol to the solid MBDHTAC sample of Example 9 and shearing the mixture in a Waring Blendor. A viscous liquid was obtained which remained pumpable at 72° F. and which exhibited no syneresis on aging.

EXAMPLE 11

A wax solution was prepared by dissolving 20 parts of refined paraffin wax in 80 parts of diesel oil at an elevated temperature. A semi-solid paste was formed upon cooling the solution to 72° F. Shearing of this paste in a Waring Blendor produced a very fluid liquid slurry of the wax particles in the diesel oil.

EXAMPLE 12

Twenty parts of refined paraffin wax was mixed with 80 parts of diesel oil in a Waring Blendor until the paraffin wax/diesel oil mixture appeared homogeneous. On cooling to room temperature a semi-solid phase formed. Shearing of this semi-solid paste in a Waring Blendor produced a very fluid liquid suspension of the wax particles in the diesel oil.

EXAMPLE 13

A solid sample of dimethyl dihydrogenatedtallow ammonium chloride containing 9.1% by weight of a 0.85/1 weight ratio mixture of isopropanol and water was sheared in a Waring Blendor with sufficient diesel oil to produce a viscous, flowable creamy white liquid containing 70% DMDHTAC. A portion of this liquid was heated to produce a clear solution and allowed to cool to room temperature. A solid phase resulted.

This example indicates that the DMDHTAC can be sheared into a suitable liquid to produce the liquid suspensions of this invention.

EXAMPLE 14

A sample of tallow amine (ARMEEN T) was melted. To this was added isopropanol in an amount to provide a solution containing 17% isopropanol. On cooling to room temperature a waxy solid was obtained. The waxy solid was sheared in a Waring Blendor forming a viscous pourable liquid.

EXAMPLE 15

A sample of ETHOMID HT-23, oxyethylated hydrogenatedtallow amide, was melted. To this was added isopropanol in an amount to provide a solution containing 24.4% isopropanol. On cooling to room temperature a waxy solid was obtained. The waxy solid was sheared in a Waring Blendor forming a viscous pourable liquid.

EXAMPLE 16

A sample of hydrogenatedtallow amide, ARMID HT, was melted. To this was added sufficient isopropanol to provide a solution containing 78.2% isopropanol. On cooling to room temperature a waxy solid was obtained. The waxy solid was sheared in a Waring Blendor forming a low viscosity liquid.

EXAMPLE 17

A sample of hydrogenatedtallow ammonium acetate, ARMAC HT, was melted. To this was added sufficient isopropanol to provide a solution containing 50% isopropanol. On cooling to room temperature a waxy solid was obtained. The waxy solid was sheared in a Waring Blendor forming a viscous liquid.

EXAMPLE 18

A sample of dimethyl ditallow ammonium chloride, 75% active in a mixture of water and isopropanol (ARQUAD 2T-75), is liquid at room temperature. The sample was placed in an oven at 108° C. to concentrate the sample to 80.9% active. On cooling to room temperature a waxy solid was obtained. The waxy solid was sheared in a Waring Blendor forming a viscous pourable liquid.

EXAMPLE 19

A sample of methyl-1-tallow amido ethyl-2-tallow imidazolium methyl sulfate, 78% active in isopropanol (VARISOFT 475), is liquid at room temperature. The sample was placed in an oven at 108° C. to concentrate the sample to 81% active. On cooling to room temperature a semi-solid was obtained. The semi-solid was sheared in a Waring Blendor forming a viscous pourable liquid.

EXAMPLE 20

A sample of 1-ethylene bis (2-tallow, 1-methyl imidazolium methyl sulfate), 75% active in isopropanol (VARISOFT 6112) is liquid at room temperature. The sample was placed in an oven at 108° C. to concentrate the sample to 86.8% active. On cooling to room temperature a semi-solid was obtained. The semi-solid was sheared in a Waring Blendor forming a viscous pourable liquid.

I claim:

1. A method of liquifying an organic material which is a waxy solid at ambient temperature, which comprises:
   (a) admixing a solvent with said organic material at a temperature such that a solution is formed;
   (b) cooling the solution to a temperature such that a solid or semi-solid, viscous material is formed; and
   (c) shearing said solid or semi-solid material to produce particles of said organic material suspended in said solvent; wherein the concentration of said solvent is sufficient to produce a liquid as a result of step (c) and to produce a solid or semi-solid, viscous material as a result of step (b); wherein said organic material is selected from the group consisting of amines, amine salts, quaternary ammonium salts, and mixtures thereof; and wherein said solvent is selected from the group consisting of water, alcohols having from one to five carbon atoms, and mixtures thereof.

2. The method of claim 1 wherein said liquid suspension obtained from step (c) is heated slightly to affect a slight re-solubilization of said organic material in said solvent thus decreasing the tendency of said particles of said organic material to settle out of said suspension.

3. The method of claim 1 wherein there is added to said liquid obtained from step (c) a sufficient quantity of a mixture of said organic material and said solvent which has not been sheared to decrease the tendency of said particles of said organic material to settle out of said suspension.

4. The method of claim 1 wherein there is added to said liquid obtained from step (c) a mixture of said organic material and said solvent which has been previously sheared and heated slightly to affect a partial re-solubilization of said organic material in said solvent in an amount sufficient to decrease the tendency of said particles of said organic material to settle out of said suspension.

5. The method of claim 1 wherein there is added to said liquid obtained from step (c) a sufficient quantity of a hot mixture of said organic material and said solvent to decrease the tendency of said particles of said organic material to settle out of said suspension.

6. The method of claims 1, 2, 3, 4, or 5, wherein said organic material is selected from the group consisting of fatty amines, fatty amine salts, fatty quaternary ammonium salts, and mixtures thereof.

7. The method of claims 1, 2, 3, 4, or 5, wherein said organic material is selected from the group consisting of fatty amines, fatty amine salts, fatty quaternary ammonium salts, and mixtures thereof, and wherein said solvent is selected from the group consisting of water, methanol, ethanol, propanol, isopropanol, and mixtures thereof.

8. The method of claims 1, 2, 3, 4, or 5, wherein said organic material is a fatty quaternary ammonium salt and wherein said solvent is isopropanol or an isopropanol-water mixture.

9. A method of liquifying an organic material which is a waxy solid at ambient temperature, which comprises:
(a) admixing a solvent with said organic material at a temperature such that a solution is formed;
(b) cooling the solution to a temperature such that a solid or semi-solid, viscous material is formed;
(c) adding additional solvent to said solid or semi-solid viscous material;
(d) shearing said solid or semi-solid material to produce particles of said organic material suspended in said solvent; wherein the concentration of said solvent is sufficient to produce a liquid as a result of step (d); wherein said organic material is selected from the group consisting of amines, amine salts, quaternary ammonium salts, and mixtures thereof; and wherein said solvent is selected from the group consisting of water, alcohols having from one to five carbon atoms, and mixtures thereof.

* * * * *